(12) United States Patent
Singleton

(10) Patent No.: US 10,486,659 B2
(45) Date of Patent: Nov. 26, 2019

(54) MANUAL PARK RELEASE DEVICE FOR VEHICLE

(71) Applicant: Kongsberg Driveline Systems I, Inc., Novi, MI (US)

(72) Inventor: Steve Singleton, Commerce, MI (US)

(73) Assignee: Kongsberg Driveline Systems I, Inc., Novi, MI (US)

( * ) Notice: Subject to any disclaimer, the term of this patent is extended or adjusted under 35 U.S.C. 154(b) by 145 days.

(21) Appl. No.: 15/741,412

(22) PCT Filed: Jul. 2, 2015

(86) PCT No.: PCT/US2015/038983
§ 371 (c)(1),
(2) Date: Jan. 2, 2018

(87) PCT Pub. No.: WO2017/003481
PCT Pub. Date: Jan. 5, 2017

(65) Prior Publication Data
US 2018/0370501 A1    Dec. 27, 2018

(51) Int. Cl.
| | |
|---|---|
| *B60T 7/10* | (2006.01) |
| *G05G 5/06* | (2006.01) |
| *B60K 20/02* | (2006.01) |
| *G05G 1/04* | (2006.01) |
| *B60T 11/04* | (2006.01) |
| *F16H 59/10* | (2006.01) |
| *F16H 63/34* | (2006.01) |
| *F16H 61/36* | (2006.01) |

(Continued)

(52) U.S. Cl.
CPC ............. *B60T 7/104* (2013.01); *B60K 20/02* (2013.01); *B60T 7/10* (2013.01); *B60T 11/046* (2013.01); *F16H 59/10* (2013.01); *F16H 59/105* (2013.01); *F16H 61/36* (2013.01); *F16H 63/3458* (2013.01); *F16H 63/3491* (2013.01); *G05G 1/04* (2013.01); *G05G 5/06* (2013.01); *F16H 2059/026* (2013.01); *F16H 2061/1224* (2013.01)

(58) Field of Classification Search
CPC . B60T 7/10; B60T 7/102; B60T 7/104; B60T 11/046; B60K 20/02; F16H 51/00; F16H 59/10; F16H 59/105; F16H 2059/026; F16H 2061/1224; F16H 61/36; F16H 63/34; F16H 63/3458; F16H 63/3491; F16H 63/38; G05G 1/04; G05G 5/06
See application file for complete search history.

(56) References Cited

U.S. PATENT DOCUMENTS

| | | | | |
|---|---|---|---|---|
| 2005/0217411 A1* | 10/2005 | Ferenc | ................... | B60T 7/085 74/537 |
| 2016/0107622 A1* | 4/2016 | Rizzini | ................... | B60T 7/104 74/523 |

\* cited by examiner

*Primary Examiner* — Prasad V Gokhale
(74) *Attorney, Agent, or Firm* — Mintz Levin Cohn Ferris Glovsky and Popeo, P.C.; Steven M. Jensen

(57) ABSTRACT

A manual park release device includes: a bracket; a pin protruding outwardly from the bracket; a lever pivotably connected to the bracket at a pivot point and configured to rotate about the pivot point in response to a pull of the lever in a pulling direction, such that a first lever position corresponds to a park range of a transmission, and a second lever position corresponds to an out-of-park range of the transmission; and a channel formed in a body of the lever on a side of the lever toward which the pin protrudes, such that the pin interfaces with the channel and is movable in the channel when the lever rotates about the pivot point.

20 Claims, 10 Drawing Sheets

(51) Int. Cl.
*F16H 61/12* (2010.01)
*F16H 59/02* (2006.01)

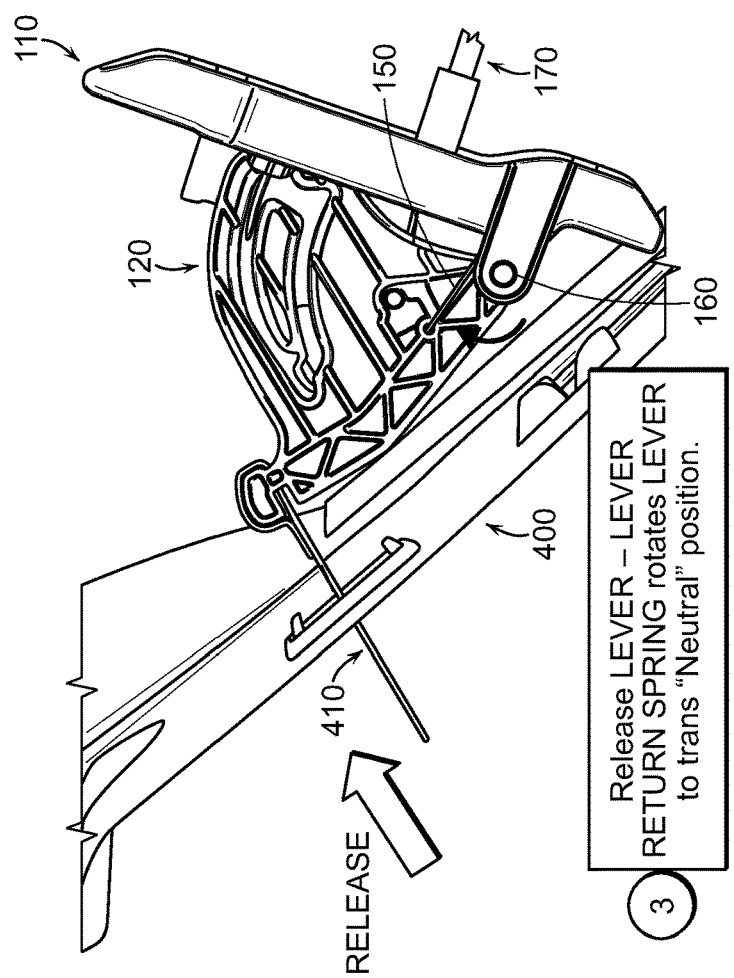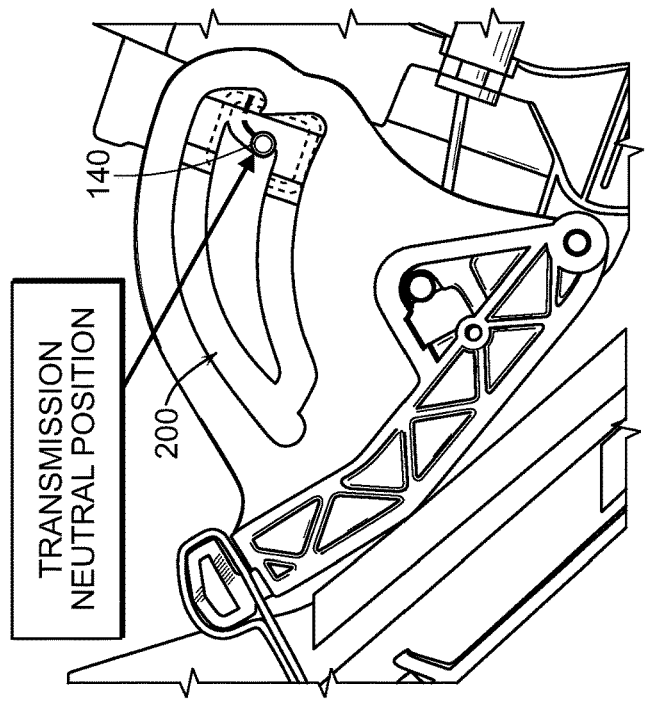
FIG. 7A
FIG. 7B

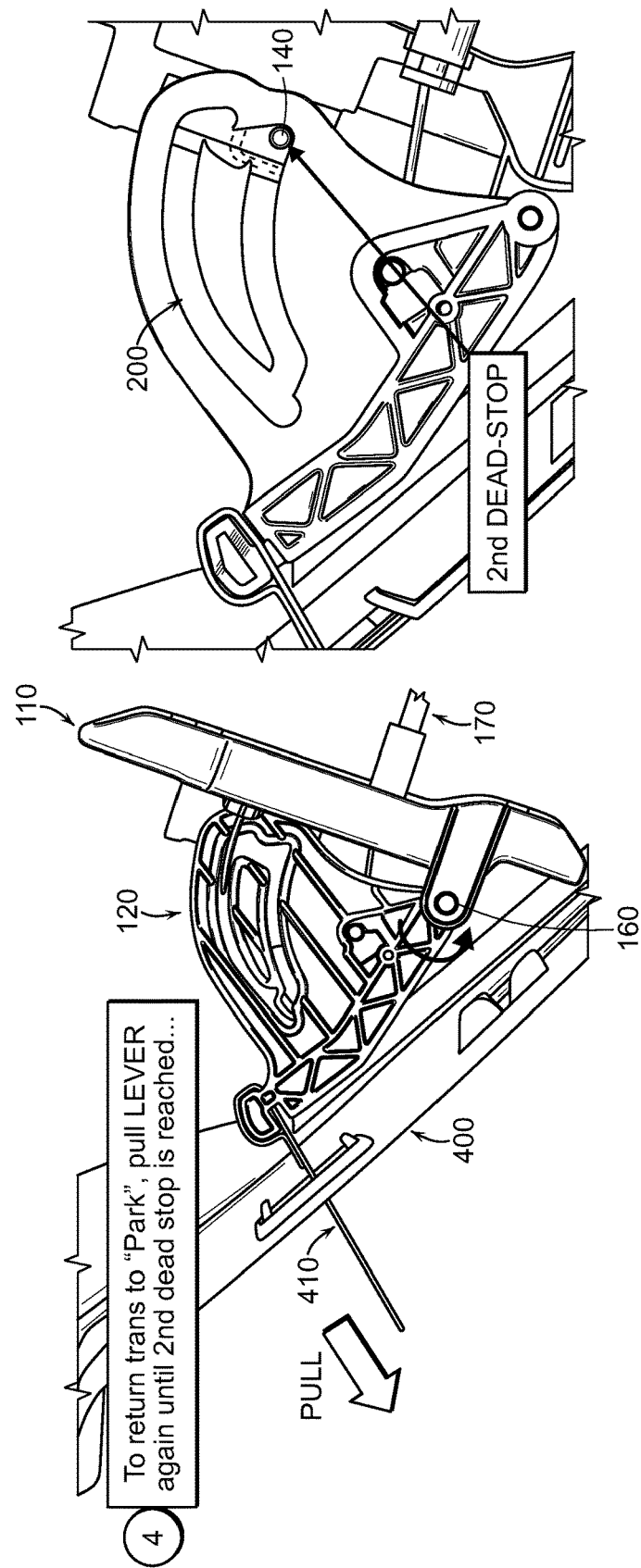

MANUAL PARK RELEASE DEVICE FOR VEHICLE

CROSS-REFERENCE TO RELATED APPLICATION

This application is a National Phase application filed under 35 U.S.C. § 371 of PCT International Application No. PCT/US2015/038983 with an International Filing Date of Jul. 2, 2015, the entire contents of which are incorporated herein by reference.

BACKGROUND (a) Technical Field

The present disclosure relates generally to automotive technologies, and more particularly, to a manual park release device for a transmission of a vehicle.

(b) Background Art

In traditional transmission shifting systems, transmission modes (e.g., park, neutral, reverse, drive, etc.) can be changed using mechanical links between the gear shifter and the transmission. However, in vehicles using a shift-by-wire (SBW) system, the transition between transmission modes is accomplished through electronic controls without any mechanical links between the gear shifter and the transmission. SBW systems can save space in the vehicle by eliminating space required for housing the mechanical links found in traditional shifting systems. Further, due to the elimination of mechanical links between the gear shifter and transmission, minimal effort is required on behalf of the driver during gear selection, as many SBW systems allow for shifting through the press of a button or a switch. SBW systems also provide for improved calibration and smoothness of shifts in particular circumstances, as compared to traditional shifting systems.

Problematically, in the event of a power failure, a SBW system may be unable to shift out of the park range, as the driveline of the vehicle is locked. It is therefore very difficult for such vehicle to be towed when the driveline is locked. To address this problem, a manual park release device can be used to override the SBW system and manually remove the transmission from the park range (into neutral, for example). Conventional manual park release devices generally include a manually operated lever which, when operated, actuates a cable that is connected to the transmission in such a manner as to pull the transmission from the park range, or at least unlock the driveline.

When the transmission has been brought out of the park range, it is beneficial for the manual park release device to include functionality for keeping the transmission in the out-of-park range, as well as allowing the transmission to return to the park range (e.g., after the vehicle has been towed). To this end, some conventional manual park releases comprise a locking mechanism and a spring-bias that tends to return the transmission to the park range. When the operator pulls the manual park release device (against the spring-bias) into a position corresponding to a disengaged P-range, the locking mechanism can lock the manual park release device in place. Then, to return the transmission to the park range, the operator can unlock the locking mechanism, so the manual park release device can return to the position corresponding to the park range, thereby allowing the transmission to return to the park range.

However, such manual park release devices typically require two hands for operation, namely, one hand for operating the manual park release lever and the other for operating the locking mechanism. This can be particularly cumbersome when the manual park release device is positioned in a position that is difficult to access, such as underneath the center console or near the trunk of the vehicle, and the driver is required to keep his or her foot on the brake (i.e., so the vehicle does not roll when it is pulled out of park into neutral). Moreover, a tool is often required for disengaging a plunger or the like prior to pulling the manual park release lever.

SUMMARY OF THE DISCLOSURE

The present disclosure provides a manual park release device that allows for easily moving the transmission of a vehicle to and from the park range, even when the access to the manual park release device is limited. In particular, the present disclosure allows an operator to pull a lever of the manual park device a first time to achieve an out-of-park range (e.g., neutral), where the manual park release device and transmission will be retained. Then, the operator may subsequently pull the lever a second time to move the manual park release device and transmission back into the park range. Notably, operation of the manual park release device disclosed herein may be achieved using a single hand, thus allowing for greater convenience and ease of use for the operator.

According to embodiments of the present disclosure, a manual park release device includes: a bracket; a pin protruding outwardly from the bracket; a lever pivotably connected to the bracket at a pivot point and configured to rotate about the pivot point in response to a pull of the lever in a pulling direction, such that a first lever position corresponds to a park range of a transmission, and a second lever position corresponds to an out-of-park range of the transmission; and a channel formed in a body of the lever on a side of the lever toward which the pin protrudes, such that the pin interfaces with the channel and is movable in the channel when the lever rotates about the pivot point, where the channel is configured to retain the pin at a first channel position and at a second channel position, the lever is positioned in the first lever position when the pin is retained at the first channel position, and the lever is positioned in the second lever position when the pin is retained at the second channel position, the channel includes a first channel path from the first channel position to the second channel position and a second channel path differing from the first channel path from the second channel position to the first channel position, and a first pull of the lever in the pulling direction causes the pin to move along one of the first channel path and the second channel path, and a second pull of the lever in the pulling direction causes the pin to move along the other of the first channel path and the second channel path.

The pin may move from the first channel position toward the second channel position when moving along the first channel path, and the pin may move from the second channel position toward the first channel position when moving along the second channel path.

The channel may include a continuous circuit comprised of the first channel path and the second channel path.

The manual park release device may further include: a first dead stop in the first channel path; and a second dead stop in the second channel path.

The pin may move from the first channel position toward the first dead stop and the second channel position when moving along the first channel path, and the pin may move from the second channel position toward the second dead stop and the first channel position when moving along the second channel path.

Haptic feedback may be provided when the pin reaches the first dead stop or the second dead stop.

The pin may be slidably arranged on the bracket.

The manual park release device may further include: a slider slidably arranged on the bracket, wherein the pin is disposed on the slider.

The slider may be configured to slide longitudinally with respect to the bracket.

The first channel position and the second channel position may be formed as notches in the channel.

The out-of-park range of the transmission may be a neutral gear position.

The manual park release device may further include: a lever return spring coupling the bracket and the lever and providing a spring-bias that tends to return the lever to one of the first lever position and the second lever position, based on a position of the pin within the channel.

The manual park release device may further include: a tab member disposed in the channel preventing the pin from moving in a particular direction in the channel The pin may not be permitted to move in the channel in either a clockwise or a counter-clockwise direction.

Furthermore, according to embodiments of the present disclose, a vehicle includes: a driveline; a transmission having a park range and an out-of-park range; an electronic actuator configured to change an active range of the transmission; an electronic shifter configured to cause the electronic actuator to change the active range of the transmission; and a manual park release device operably coupled to the transmission including: a bracket; a pin protruding outwardly from the bracket; a lever pivotably connected to the bracket at a pivot point and configured to rotate about the pivot point in response to a pull of the lever in a pulling direction, such that a first lever position corresponds to the park range of the transmission, and a second lever position corresponds to the out-of-park range of the transmission; and a channel formed in a body of the lever on a side of the lever toward which the pin protrudes, such that the pin interfaces with the channel and is movable in the channel when the lever rotates about the pivot point, wherein the channel is configured to retain the pin at a first channel position and at a second channel position, the lever is positioned in the first lever position when the pin is retained at the first channel position, and the lever is positioned in the second lever position when the pin is retained at the second channel position, the channel includes a first channel path from the first channel position to the second channel position and a second channel path differing from the first channel path from the second channel position to the first channel position, and a first pull of the lever in the pulling direction causes the pin to move along one of the first channel path and the second channel path, and a second pull of the lever in the pulling direction causes the pin to move along the other of the first channel path and the second channel path.

Ranges of the transmission may be changed using a shift-by-wire (SBW) system.

The lever of the manual park release device may be operably connected to the transmission via a cable.

The driveline may be in a positively locked state.

The manual park release device may be concealed behind a dash panel or a console of the vehicle.

Furthermore, according to embodiments of the present disclosure, a manual park release method includes: receiving, at a lever of a manual park release device that is pivotably connected to a bracket, a first pull in a pulling direction, causing a pin protruding outwardly from the bracket to move in a channel of the lever along one of a first channel path and a second channel path; retaining the pin in the channel at one of a first channel position and a second channel position; setting a first position of the lever according to the pin being retained at the one of the first channel position and the second channel position; causing a transmission to change from one of a park range and an out-of-park range to the other of the park range and the out-of-park range in response to the first position of the lever; receiving, at the lever, a second pull in the pulling direction, causing the pin to move in the channel along the other of the first channel path and the second channel path; retaining the pin in the channel at the other of the first channel position and the second channel position; setting a second position of the lever according to the pin being retained at the other of the first channel position and the second channel position; and causing the transmission to revert back to the one of the park range and the out-of-park range from the other of the park range and the out-of-park range in response to the second position of the lever.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 5A through FIG. 9B illustrate several example step-by-step views of the manual park release device during operation.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

It is understood that the term "vehicle," "vehicular," "automotive," or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum). As referred to herein, an electric vehicle (EV) is a vehicle that includes, as part of its locomotion capabilities, electrical power derived from a chargeable energy storage device (e.g., one or more rechargeable electrochemical cells or other type of battery). An EV is not limited to an automobile and may include motorcycles, carts, scooters, and the like. Furthermore, a hybrid vehicle is a vehicle that has two or more sources of power, for example both gasoline-based power and electric-based power (e.g., a hybrid electric vehicle (HEV)).

Figure 1:
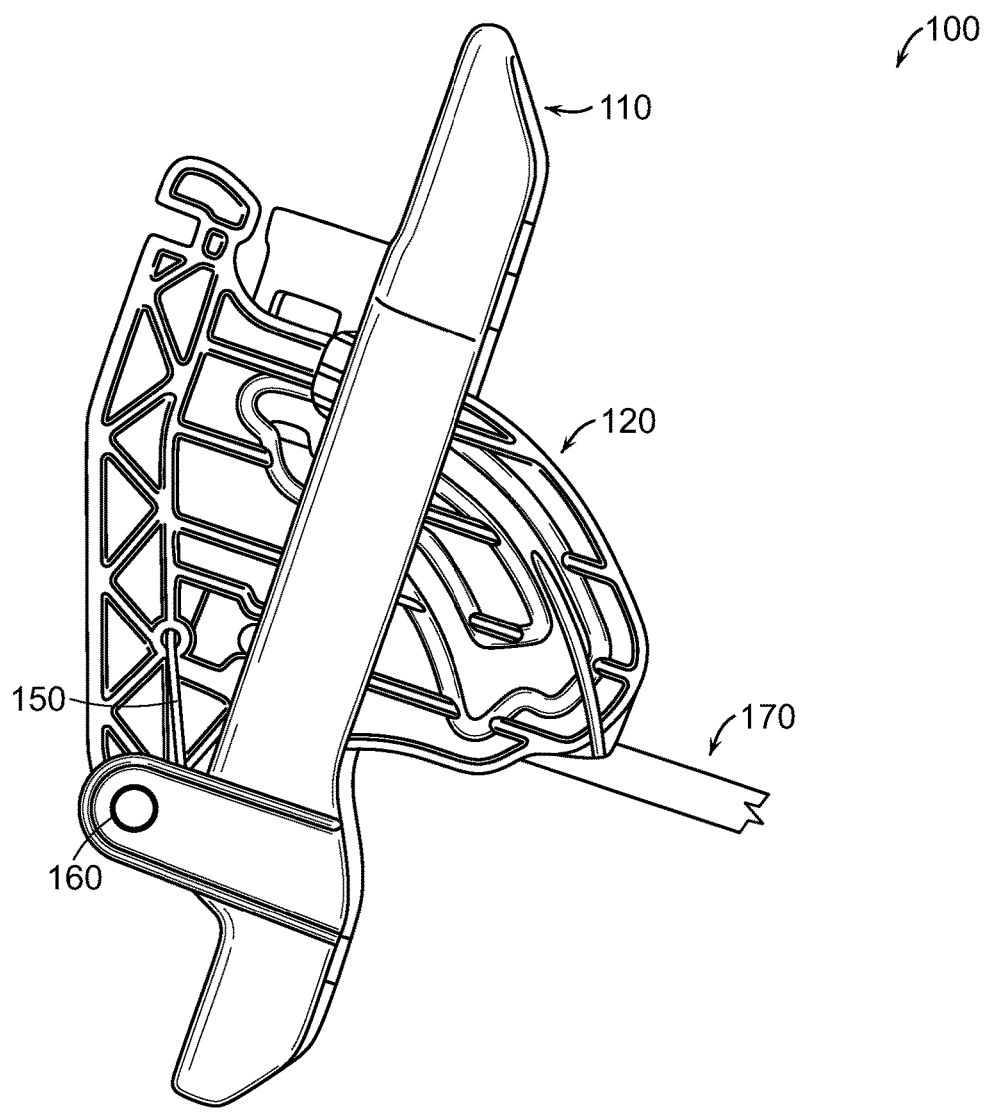
FIG. 1 illustrates an example bracket-side view of a manual park release device.
Figure 3:
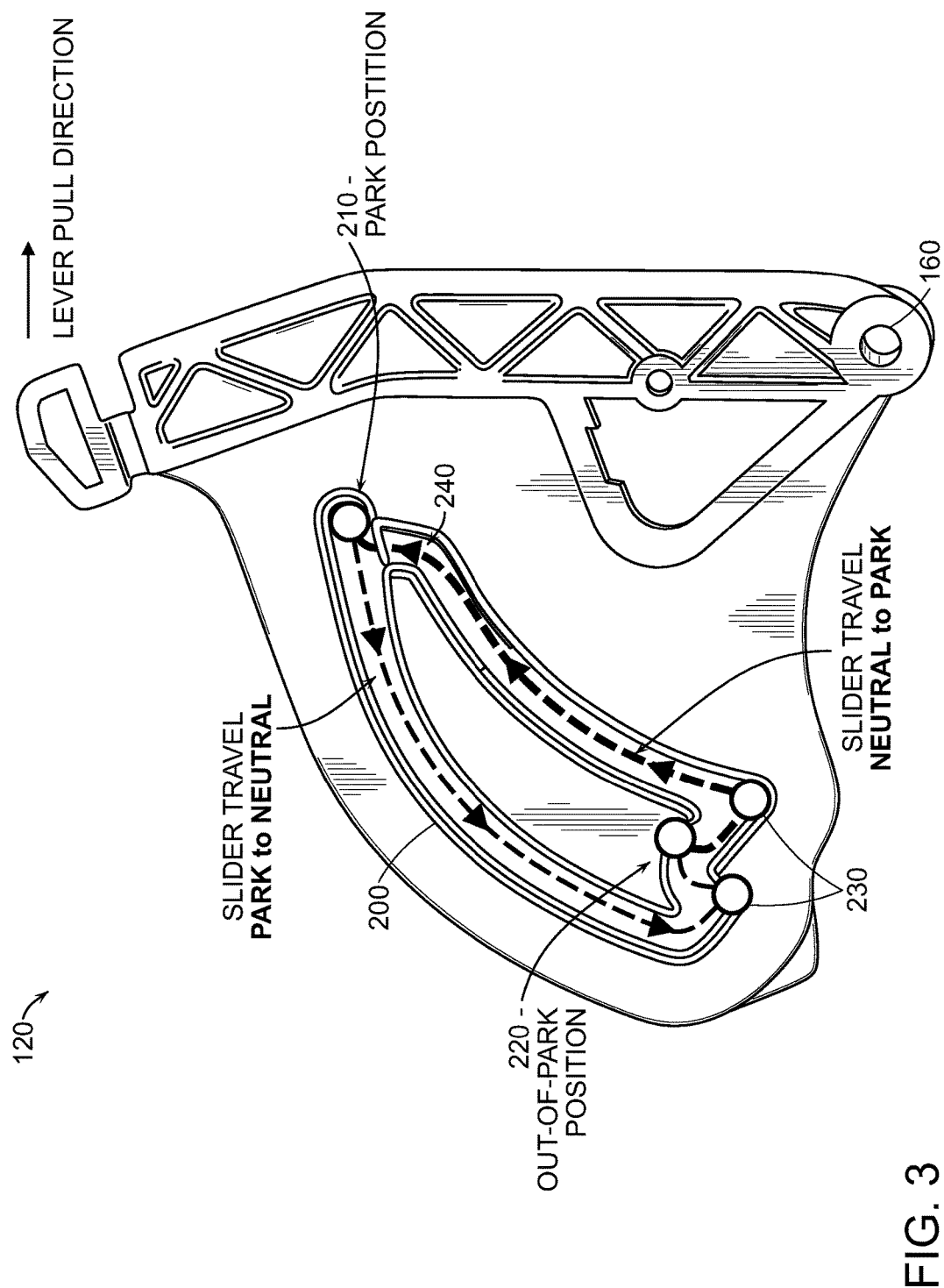
FIG. 3 illustrates an example lever-side view of a lever of the manual park release device.

Referring now to embodiments of the present disclosure, FIG. 1 illustrates an example bracket-side view of a manual park release device, and FIG. 3 illustrates an example lever-side view of a lever of the manual park release device. In this regard, the manual park release device 100 includes a lever 120 that is automatically lockable in an out-of-park range (e.g., neutral) of the transmission and moveable between the out-of-park range and the park range of the transmission by pulling the lever 120 in the same direction (hereinafter referred to as the "lever pull direction" or "pulling direction"). That is, the manual park release device 100 allows an operator (e.g., driver, passenger, etc.) to pull the lever 120 a first time to achieve the out-of-park range, where the manual park release device 100 and transmission will be retained. Then, the operator may subsequently pull the lever 120 a second time to move the manual park release device 100 and transmission back into the park range. Notably, operation of the manual park release device disclosed herein may be achieved using a single hand, thus allowing for greater convenience and ease of use for the operator. This functionality is achieved, in part, by a pin-and-channel interface between a pin 140 and a channel 200 created between the manual park release lever 120 and a bracket 110 to which the lever 120 is pivotably connected.

As shown in FIG. 1, the manual park release device 100 may include a lever 120 that is pivotably connected to a bracket 110 at a pivot point 160. The lever 120 may be configured to rotate about the pivot point 160 in response to a pull of the lever 120 in a pulling direction. The bracket 110 and lever 120 may be further coupled via a lever return spring 150 which provides a spring-bias that tends to return the lever 120 to one of the first lever position and the second lever position (e.g., the park range or out-of-park range), based on a position of the pin 140 within the channel 200, as described in further detail with respect to FIGS. 5-9. Notably, the arrangement of the manual park release device 100 as depicted in FIGS. 1 and 2, and particularly, the manner in which the components of the manual park release device 100 are formed and interact with one another, is for demonstration purposes only and should not be treated as limiting the scope of the claims.

Figure 10A:
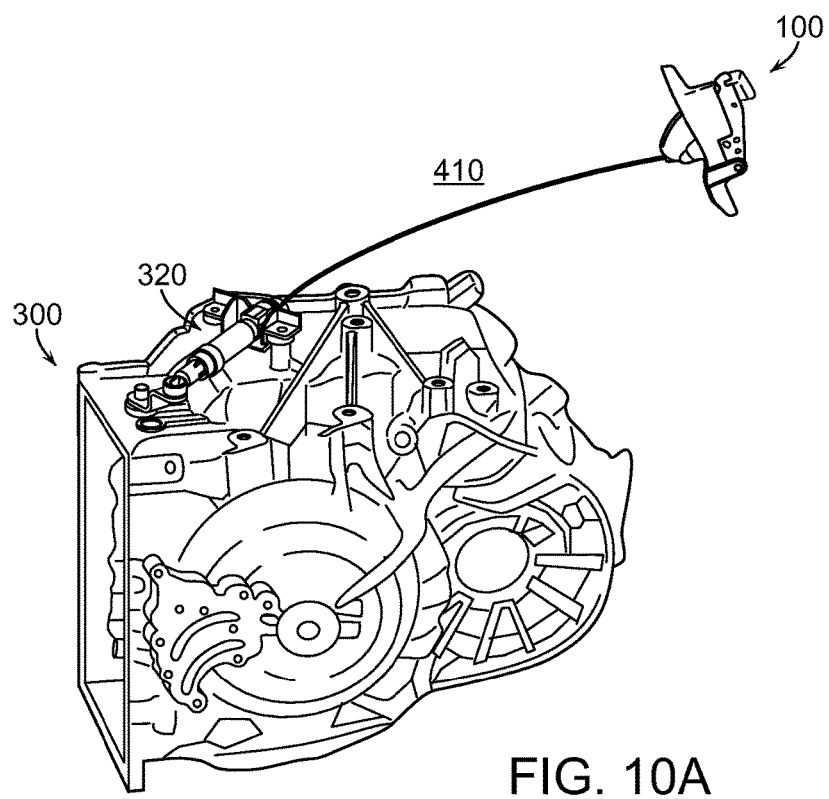
FIGS. 10A and 10B illustrate an example representation of a transmission system incorporating the manual park release device.
Figure 10B:
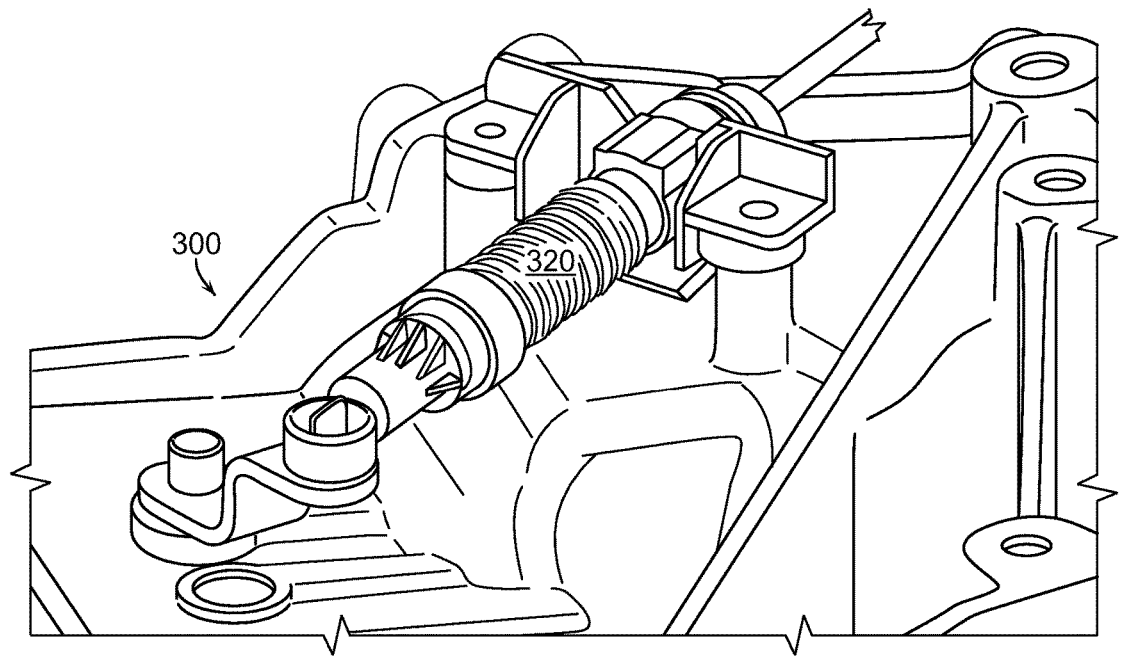

The lever 120 may be operably coupled to a transmission of a vehicle. For instance, FIGS. 10A and 10B illustrate an example representation of a transmission system incorporating the manual park release device. As shown in FIG. 10A, the manual park release device 100 is connected to a generic transmission 300 of a vehicle via a cable 170. Therefore, when the lever 120 is operated (i.e., pulled in the pulling direction), the cable 170 connected to the transmission 300 may be actuated in such a manner as to pull the transmission 300 from an active range (e.g., park range or out-of-park range) to another range.

As an example, in the event that the driveline of a vehicle is locked (e.g., due to a power failure), the transmission 300 may be pulled from the park range into an out-of-park range—or at least the driveline may be unlocked—in response to the actuation of the cable 170, thereby allowing the vehicle to be towed more easily. Further, the cable 170 may connect to an actuator mechanism 320 that is coupled to the transmission 300 and controls and facilitates the change of gears. In this regard, the position of the actuator mechanism 320 can be adjusted (e.g., pulled, pivoted, etc.) in response to a pulling force exerted by the cable 170, thus actuating a gear change in the transmission 300, as shown in FIG. 10B. Notably, the operable connection between the lever 120 and the transmission 300 may be implemented in any suitable manner, as would be understood by a person of ordinary skill in the art.

Because the lever 120 of the manual park release device 100 is operably connected to the vehicle's transmission, the active transmission range may be changed according to the position of the lever 120. For instance, a first position of the lever 120 (e.g., "first lever position") may correspond to a park range of a transmission, while a second position of the lever 120 (e.g., "second lever position") corresponds to an out-of-park range of the transmission. In other words, by pulling the lever 120 in the pulling direction from the first lever position to the second lever position, the transmission may be pulled out of the park range into the out-of-park range, thereby allowing the vehicle to be readily transported. Then, by pulling the lever 120 in the pulling direction again, the lever 120 may move back into the first lever position, and the transmission may revert back to the park range from the out-of-park range accordingly.

Figure 2A:
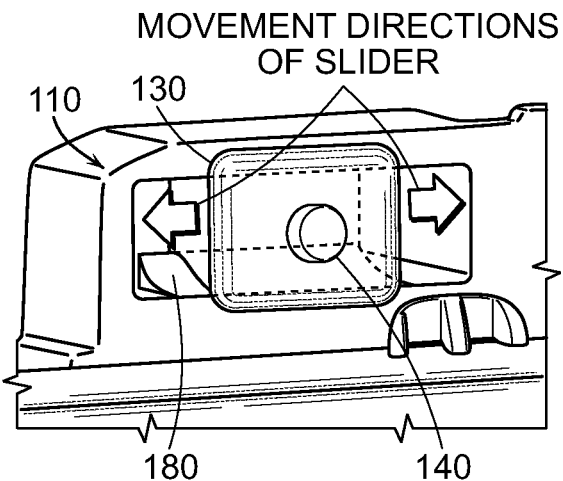
FIGS. 2A and 2B illustrate example views of a bracket and slider assembly of the manual park release device.
Figure 2B:
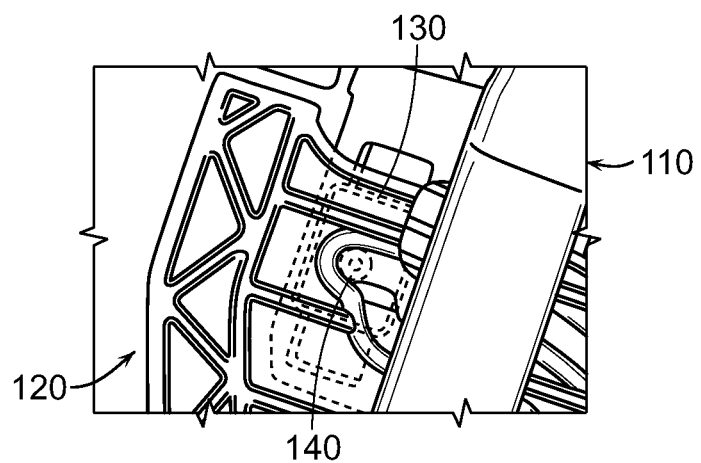

FIGS. 2A and 2B illustrate example views of a bracket and slider assembly of the manual park release device. As shown in FIGS. 2A and 2B, a pin 140 may protrude outwardly from the bracket 110 toward a side of the body of the lever 120 in which a channel 200 is formed (e.g., see also FIG. 3). Specifically, the pin 140 may be disposed on a slider 130 that is slidably arranged on the bracket 110, e.g., by riding on a track formed on the bracket 110. As shown in FIG. 2A, the pin 140 can move longitudinally with respect to the bracket 110 as a result of the sliding motion of the slider 130. In addition, the bracket 110 may include a tension spring 180 which lies in abutment with the slider 130, creates a frictional resistance against the sliding motion of the slider 130, and substantially eliminates rattle.

Referring now to FIG. 3, which illustrates the slider path of the manual park release device 100 during activation, a guide channel 200 may be formed in a body of the lever 120 on a side of the lever 120 toward which the pin 140 protrudes. Consequently, the pin 140 can interface/engage with the channel 200 and move in the channel 200 (e.g., when the lever 120 rotates about the pivot point 160). The channel 200 may include a continuous circuit that is comprised of a first channel path (e.g., "park to neutral") and a second channel path ("neutral to park"). That is, the first channel path may connect to the second channel path, and vice versa, thereby creating a continuous channel loop.

Further, the channel 200 may be formed in such a manner to permit the pin 140 to move therethrough in only a single direction (e.g., counter-clockwise, as shown in FIG. 3). In other words, the channel 200 may be formed to prevent the pin 140 from moving in a particular direction (e.g., clockwise). To this end, a tab member 240 may be integrated into the channel 200 so as to prevent the pin 140 from moving in the impermissible direction (the permissible/impermissible direction may differ according to the configuration of the manual park release device 100). The tab member 240 may extend into the channel 200 from the bottom portion of the channel 200 in an inclined fashion, such that when the pin 140 moves over the tab member 240 in the counter-clockwise direction, the tab member 240 pushes out of the channel 140. If the pin 140 attempts to move clockwise, however, the tab member 240 can stop the pin 140 from moving in this direction. Effectively, a "one-way street" effect may be created in the channel 200. Alternatively, the tab member 240 may be a spring-like mechanism.

Figure 4:
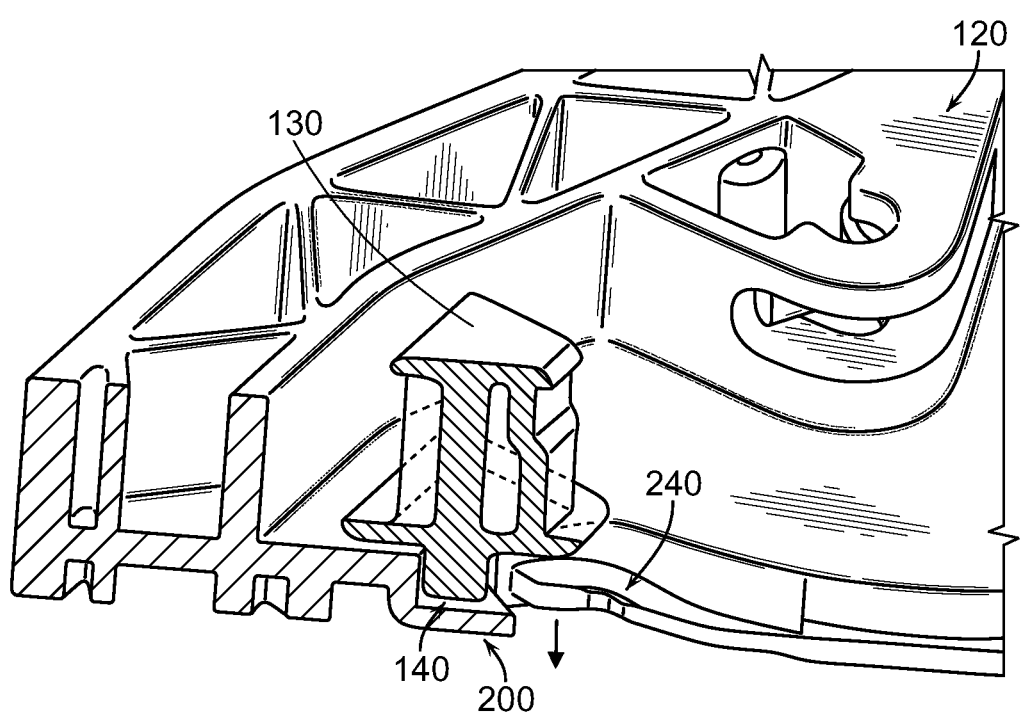
FIG. 4 illustrates an example cross-sectional view of a slider and pin mechanism in engagement with a channel of the manual park release device.

In this regard, FIG. 4 illustrates an example cross-sectional view of a slider and pin mechanism in engagement with a channel of the manual park release device. As shown in FIG. 4, the pin 140 extending outwardly from the slider 130 can be inserted into and engage with the channel 200 that is formed into the lever 120. The pin 140 can travel throughout the channel 200 resulting from movement of the lever 120 and slider 130. Additionally, the tab member 240 may extend into the channel 200 from the bottom portion of the channel 200 in an inclined fashion. The tab member 240 allows the pin 140 to move in one direction (e.g., counter-clockwise) over the tab member 240, but if the pin 140 attempts to move in the opposite direction (e.g., clockwise), the tab member 240 can stop the pin 140.

Referring again to FIG. 3, the first channel path (e.g., "park to neutral") may extend from a first channel position 210 (e.g., "park position") to a second channel position 220 (e.g., "out-of-park position"). The second channel path (e.g., "neutral to park"), which differs from the first channel path, may extend from the second channel position 220 (e.g., "out-of-park position") to the first channel position 210 (e.g., "park position"). The pin 140 may move from the first channel position 210 toward the second channel position 220 when moving along the first channel path, and the pin 140 may move from the second channel position 220 toward the first channel position 210 when moving along the second channel path. Further, dead stop positions 230, where the pin 140 may temporarily stop, may be disposed in the first and second channel paths, as explained in further detail below.

The channel 200 may be configured to retain the pin 140 at the first channel position 210 (e.g., "park position") and at the second channel position 220 (e.g., "out-of-park position"). The first channel position 210 and the second channel position 220 may include a notch that functions to retain the pin 140. Notably, the positioning of the lever 120—which affects the active range of the transmission—depends upon the positioning of the pin 140 in the channel 200. In particular, the lever 120 may be positioned in a first lever position, which corresponds to the park range of the transmission, when the pin 140 is retained at the first channel position 210 in the channel 200. Conversely, the lever 120 may be positioned in a second lever position, which corresponds to the out-of-park range of the transmission, when the pin 140 is retained at the second channel position 220 in the channel 200.

Notably, the pin 140 moves through the channel 200 when the lever 120 rotates about the pivot point 160 in response to a pull of the lever 120 (the "movement" of the pin 140 through the channel 200 is artificial, in a sense, as the lever 120 is actually being moved, while the pin 140 is simply guided through the channel 200, e.g., due to the slider 130 and the walls of the channel 200). To this point, a first pull of the lever 120 in the pulling direction may cause the pin 140 to move along the first channel path from the first channel position 210 (e.g., park range) toward the second channel position 220 (e.g., out-of-park range). Upon release of the lever 120, the channel 200 may retain the pin 140 at the second channel position 220, thereby removing the transmission from the park range. Then, a second, subsequent pull of the lever 120 in the pulling direction (i.e., the same direction) may cause the pin 140 to move along the second channel path from the second channel position 220 back toward the first channel position 210. Upon release of the lever 120, the channel 200 may retain the pin 140 at the first channel position 210, thereby disengaging the transmission from neutral and reverting to the park range. This process may be repeated, as necessary, by the operator (e.g., by pulling the lever 120 in the pulling direction). Optionally, a strap 410 may be attached to the lever 120 to allow for easy pulling by the operator. Further, a console plug (not shown) may be used to conceal the lever 120 and/or strap 410 in the console 400, dashboard, etc.

Operationally, the first main portion of the channel 200, i.e., first channel path, may essentially follow an arc corresponding to the position of the pin 140 relative to the lever 120 during a pivotal motion of the lever 120 from the park range position to the out-of-park range position. During this motion of the lever 120, the pin 140 may slide through the first channel path of the channel 200 toward the out-of-park range position 220. Prior to reaching the out-of-park range position 220, the pin 140 may hit a first dead stop 230. The first dead stop 230 may be arranged in the channel 200 such that when the pin 140 reaches the dead stop 230, it may slide closer to the pivot point 160. Additionally, the dead stop 230 may provide haptic feedback (e.g., due to the pin 140 abutting a protruding wall portion of the channel 200), informing the operator that the out-of-park range has been reached.

Once the haptic feedback has been received, meaning the pin has reached the first dead stop 230, the operator can release the lever 120, which allows the lever 120 to move back toward the park range position (due, in part, to the spring 150). This may cause the pin 140 to move into the out-of-park position 220 (i.e., second channel position), and consequently, the lever 120 may be retained in the out-of-park range position (i.e., second lever position). The out-of-park position 220—as well as the park position 210—may be formed as a notch in the channel 200, helping to retain the pin 140 at that position. Notably, the out-of-park position 220 may be positioned closer to the pivot point 160 of the lever 120 than the first dead stop 230. Thus, when the lever 120 is released and the pin 140 moves into the notch, it may slide even further toward the pivot point 160 of the lever 120. Alternatively, the design of the lever 120 could be altered such that the pin 140 moves in the opposite direction (i.e., away from the pivot point 160).

To move the lever 120 back to the park range (i.e., first lever position), the operator may pull the lever 120 again in the same direction (i.e., the pulling direction). This can move the pin 140 into engagement with the second dead stop 230, thus moving the pin 140 even further toward the pivot point 160 of the lever 120. When the pin reaches the second dead stop 230, haptic feedback can again be provided to the operator. At this point, the lever 120 may be released, causing the lever 120 to move back toward the park range position. During this motion, the pin 140 may slide in the second main portion of the channel 120, i.e., along the second channel path, toward the park range position 210 (i.e., first channel position). It should be noted that the displacements caused by the first and second dead stops 230 and the out-of-park notch 220 may help to align the pin 140 with the second channel path and the park range position 210, so the pin 140 may reach the park range position 210, causing the lever 120 to be positioned in the park range position as a result.

Figure 5B:
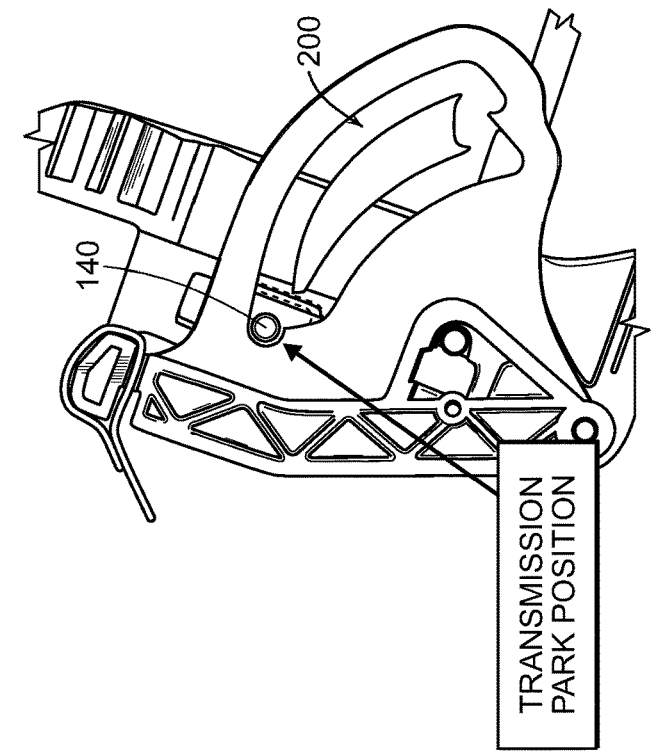
Figure 5A:
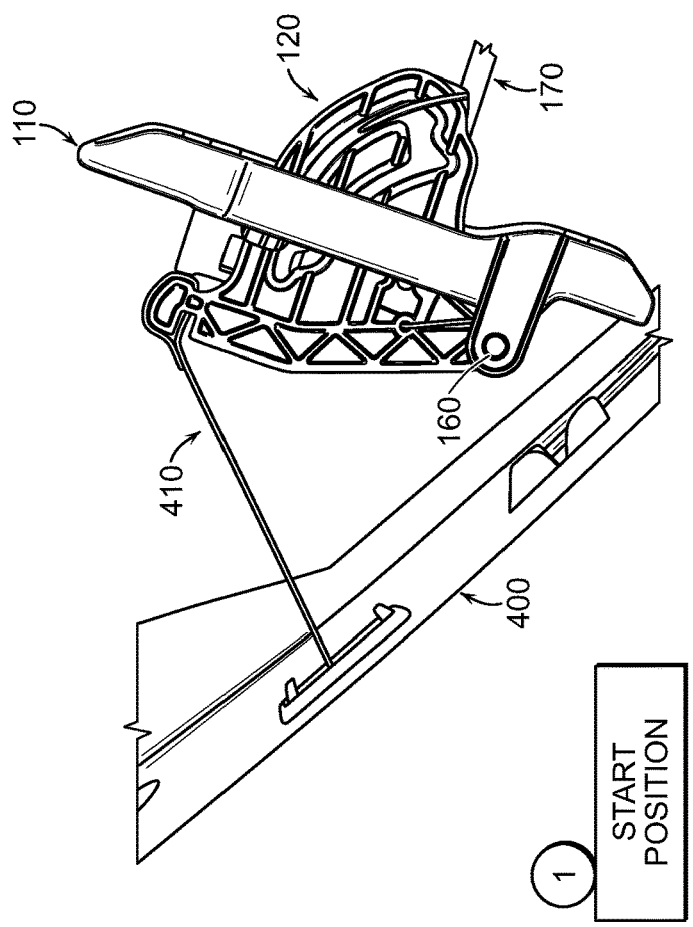

Operation of the manual park release device 100 is depicted in further detail in FIG. 5A through FIG. 9B. In this regard, FIG. 5A through FIG. 9B illustrate several example step-by-step views of the manual park release device during operation. Each step is shown for demonstration purposes only, and the arrangement of the depicted steps should not be treated as limiting the scope of the present disclosure. FIGS. 5A and 5B show a "first," i.e., "start," step during operation of the manual park release device 100, in which the transmission is in the park position. As an example, the transmission may be stuck in a park state in the event of a power failure, and thus, the transmission must be released from the park state manually. Specifically, the pin 140 may be retained in the channel 200 at the transmission park position.

Figure 6B:
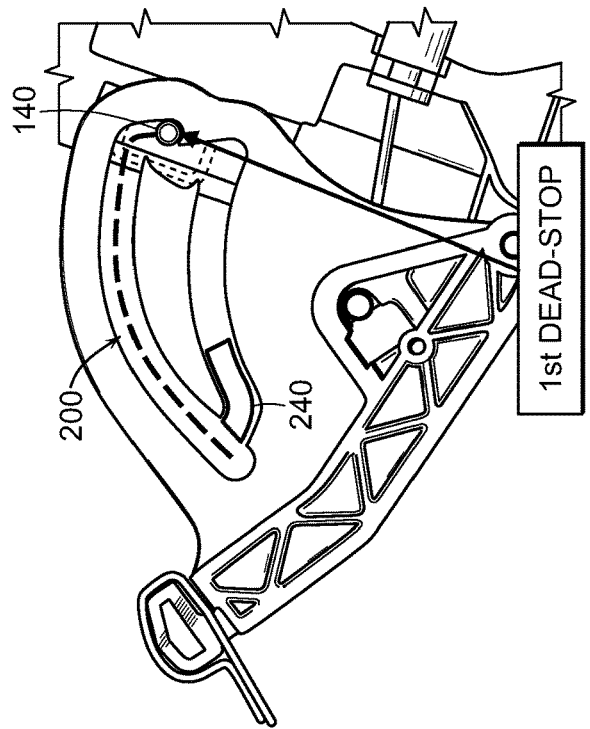
Figure 6A:
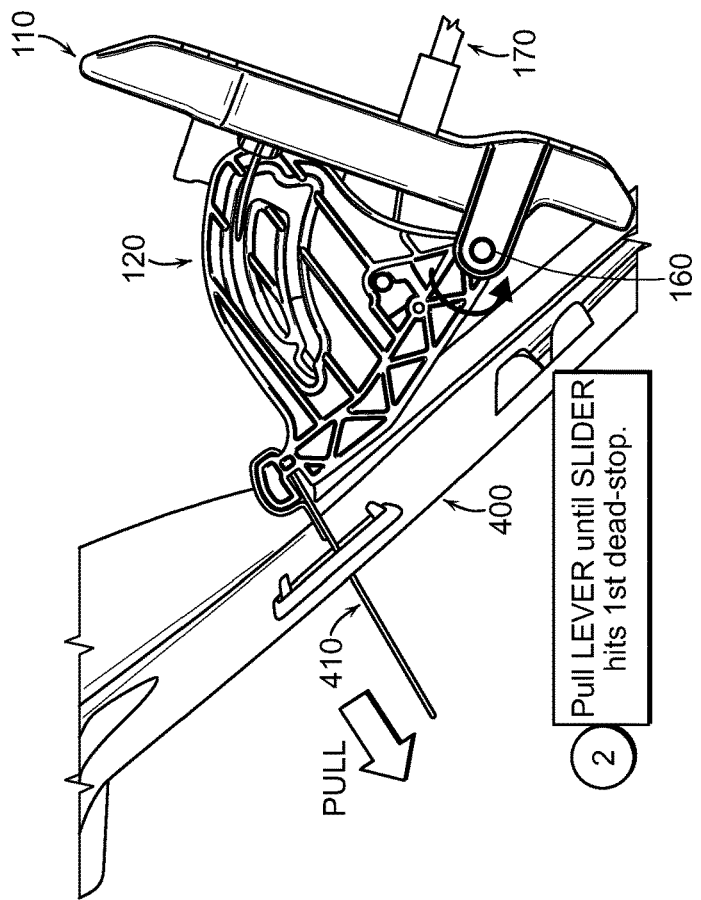

FIGS. 6A and 6B show a "second" step during operation of the manual park release device 100, in which the lever 120 is pulled for a first time until the pin 140 and/or slider 130 hit a first dead stop in the channel 200. When the lever 110 is manually pulled in this manner (e.g., via a strap 410 through a vehicle console 400), the lever 120 rotates about the pivot point 160, causing the pin 140 to move through the channel 200 in a first direction. Eventually, the pin 140 reaches the first dead stop in the channel 200 from its previous position (i.e., transmission park position).

FIGS. 7A and 7B show a "third" step during operation of the manual park release device 100, in which the lever 120 is released after it is pulled for the first time (as shown in FIGS. 6A and 6B). When the lever 120 is released, the lever 120 may rotate about the pivot point 160, causing the pin 140 to move into the transmission neutral position, so that the transmission also moves into a neutral state. The lever return spring 150 may assist in rotating the lever 120 into the transmission neutral position.

FIGS. 8A and 8B show a "fourth" step during operation of the manual park release device 100, in which the lever 120 is pulled for a second time until the pin 140 and/or slider 130 hit a second dead stop in the channel 200. When the lever 110 is manually pulled in this manner (e.g., via a strap 410 through a vehicle console 400), the lever 120 rotates about the pivot point 160, causing the pin 140 to move through the channel 200 in the first direction. Eventually, the pin 140 reaches the second dead stop in the channel 200 from its previous position (i.e., transmission neutral position).

Figure 9B:
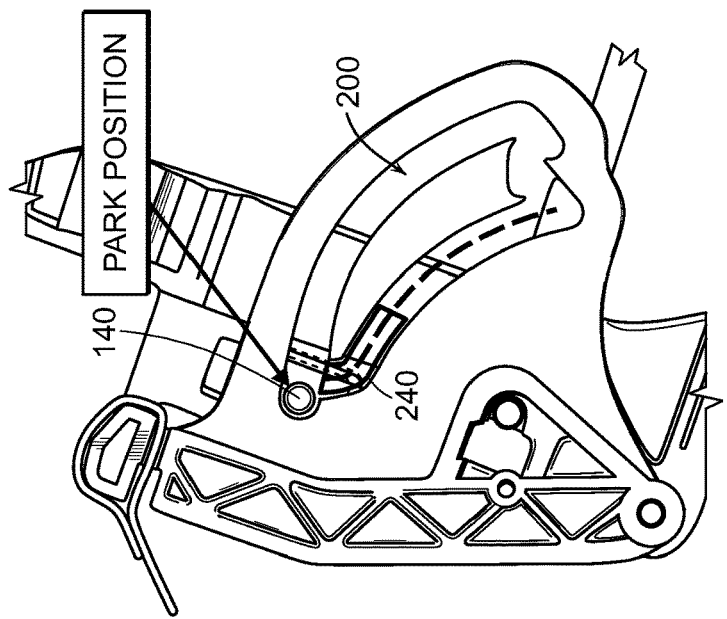
Figure 9A:
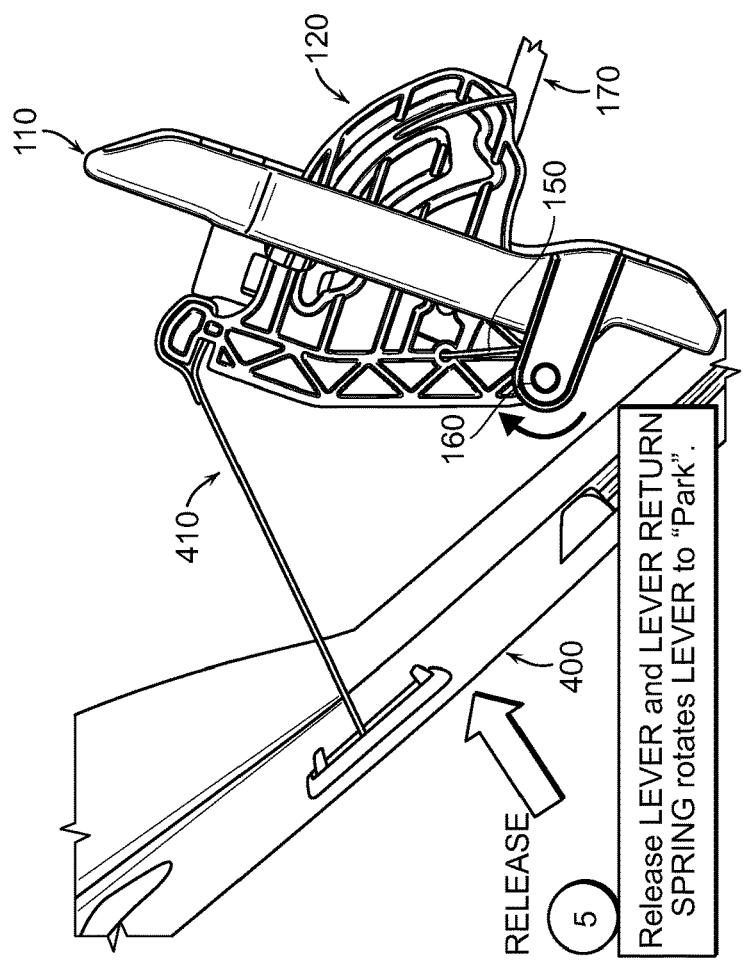

FIGS. 9A and 9B show a "fifth" step during operation of the manual park release device 100, in which the lever 120 is released after it is pulled for the second time (as shown in FIGS. 8A and 8B). When the lever 120 is released, the lever 120 may rotate about the pivot point 160, causing the pin 140 to move back into the transmission park position, so that the transmission also moves into a park state. The lever return spring 150 may assist in rotating the lever 120 into the transmission park position. As a result, the manual park release device 100 may employ a two-pull system, in which: (1) a first pull/release of the lever 120 causes the transmission to change from a first position (i.e., either a park state or a neutral state) into a second position (i.e., the other of the park state or the neutral state), and (2) a second pull/release of the lever 120 causes the transmission to change back from the second position into the first position. This operation could conceivably be repeated indefinitely, allowing a user to change a state of the transmission as desired.

Accordingly, the manual park release device disclosed herein includes a lever that is automatically lockable in an out-of-park range of the transmission and moveable between the out-of-park range and the park range of the transmission by pulling the lever in the same direction. Notably, this operation of the manual park release device may be achieved using a single hand, thus allowing for greater convenience and ease of use for the operator and eliminating the need for tools, plungers, etc. In addition to a simplified operation, the disclosed manual park release device may utilize a reduced number of parts, in comparison with conventional manual park release devices.

While there have been shown and described illustrative embodiments that provide for a manual park release device, it is to be understood that various other adaptations and modifications may be made within the spirit and scope of the embodiments herein. For example, the embodiments have been primarily shown and described herein with relation to SBW systems. However, the embodiments in their broader sense are not as limited; rather, the manual park release device disclosed herein may be used in any braking system in which the device may be suitably implemented. Thus, the embodiments may be modified in any suitable manner in accordance with the scope of the present claims.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A manual park release device comprising:
    a bracket;
    a pin protruding outwardly from the bracket;
    a lever pivotably connected to the bracket at a pivot point and configured to rotate about the pivot point in response to a pull of the lever in a pulling direction, such that a first lever position corresponds to a park range of a transmission, and a second lever position corresponds to an out-of-park range of the transmission; and
    a channel formed in a body of the lever on a side of the lever toward which the pin protrudes, such that the pin interfaces with the channel and is movable in the channel when the lever rotates about the pivot point, wherein
    the channel is configured to retain the pin at a first channel position and at a second channel position,
    the lever is positioned in the first lever position when the pin is retained at the first channel position, and the lever is positioned in the second lever position when the pin is retained at the second channel position,
    the channel includes a first channel path from the first channel position to the second channel position and a second channel path differing from the first channel path from the second channel position to the first channel position, and a first pull of the lever in the pulling direction causes the pin to move along one of the first channel path and the second channel path, and a second pull of the lever in the pulling direction causes the pin to move along the other of the first channel path and the second channel path.

2. The manual park release device of claim 1, wherein the pin moves from the first channel position toward the second channel position when moving along the first channel path, and the pin moves from the second channel position toward the first channel position when moving along the second channel path.

3. The manual park release device of claim 1, wherein the channel includes a continuous circuit comprised of the first channel path and the second channel path.

4. The manual park release device of claim 1, further comprising:
a first dead stop in the first channel path; and
a second dead stop in the second channel path.

5. The manual park release device of claim 4, wherein the pin moves from the first channel position toward the first dead stop and the second channel position when moving along the first channel path, and the pin moves from the second channel position toward the second dead stop and the first channel position when moving along the second channel path.

6. The manual park release device of claim 4, wherein haptic feedback is provided when the pin reaches the first dead stop or the second dead stop.

7. The manual park release device of claim 1, wherein the pin is slidably arranged on the bracket.

8. The manual park release device of claim 1, further comprising:
a slider slidably arranged on the bracket, wherein the pin is disposed on the slider.

9. The manual park release device of claim 8, wherein the slider is configured to slide longitudinally with respect to the bracket.

10. The manual park release device of claim 1, wherein the first channel position and the second channel position are formed as notches in the channel.

11. The manual park release device of claim 1, wherein the out-of-park range of the transmission is a neutral gear position.

12. The manual park release device of claim 1, further comprising:
a lever return spring coupling the bracket and the lever and providing a spring-bias that tends to return the lever to one of the first lever position and the second lever position, based on a position of the pin within the channel.

13. The manual park release device of claim 1, further comprising:
a tab member disposed in the channel preventing the pin from moving in a particular direction in the channel.

14. The manual park release device of claim 1, wherein the pin is not permitted to move in the channel in either a clockwise or a counter-clockwise direction.

15. A vehicle comprising:
a driveline;
a transmission having a park range and an out-of-park range;
an electronic actuator configured to change an active range of the transmission;
an electronic shifter configured to cause the electronic actuator to change the active range of the transmission; and
a manual park release device operably coupled to the transmission including:
a bracket;
a pin protruding outwardly from the bracket;
a lever pivotably connected to the bracket at a pivot point and configured to rotate about the pivot point in response to a pull of the lever in a pulling direction, such that a first lever position corresponds to the park range of the transmission, and a second lever position corresponds to the out-of-park range of the transmission; and
a channel formed in a body of the lever on a side of the lever toward which the pin protrudes, such that the pin interfaces with the channel and is movable in the channel when the lever rotates about the pivot point, wherein
the channel is configured to retain the pin at a first channel position and at a second channel position,
the lever is positioned in the first lever position when the pin is retained at the first channel position, and the lever is positioned in the second lever position when the pin is retained at the second channel position,
the channel includes a first channel path from the first channel position to the second channel position and a second channel path differing from the first channel path from the second channel position to the first channel position, and
a first pull of the lever in the pulling direction causes the pin to move along one of the first channel path and the second channel path, and a second pull of the lever in the pulling direction causes the pin to move along the other of the first channel path and the second channel path.

16. The vehicle of claim 15, wherein ranges of the transmission are changed using a shift-by-wire (SBW) system.

17. The vehicle of claim 15, wherein the lever of the manual park release device is operably connected to the transmission via a cable.

18. The vehicle of claim 15, wherein the driveline is in a positively locked state.

19. The vehicle of claim 15, wherein the manual park release device is concealed behind a dash panel or a console of the vehicle.

20. A manual park release method comprising:
receiving, at a lever of a manual park release device that is pivotably connected to a bracket, a first pull in a pulling direction, causing a pin protruding outwardly from the bracket to move in a channel of the lever along one of a first channel path and a second channel path;
retaining the pin in the channel at one of a first channel position and a second channel position;
setting a first position of the lever according to the pin being retained at the one of the first channel position and the second channel position;
causing a transmission to change from one of a park range and an out-of-park range to the other of the park range and the out-of-park range in response to the first position of the lever;
receiving, at the lever, a second pull in the pulling direction, causing the pin to move in the channel along the other of the first channel path and the second channel path;

retaining the pin in the channel at the other of the first channel position and the second channel position;

setting a second position of the lever according to the pin being retained at the other of the first channel position and the second channel position; and causing the transmission to revert back to the one of the park range and the out-of-park range from the other of the park range and the out-of-park range in response to the second position of the lever.

* * * * *